March 1, 1932.  L. I. SHAW ET AL  1,847,197

CERAMIC MATERIAL AND METHOD OF MAKING THE SAME

Original Filed Dec. 26, 1929

Inventors:
Leon I. Shaw
Walter J. Scott
By H. B. Whitfield
Atty.

Patented Mar. 1, 1932

1,847,197

UNITED STATES PATENT OFFICE

LEON I. SHAW, OF OAK PARK, AND WALTER J. SCOTT, OF BROOKFIELD, ILLINOIS, ASSIGNORS TO WESTERN ELECTRIC COMPANY, INCORPORATED, OF NEW YORK, N. Y., A CORPORATION OF NEW YORK

CERAMIC MATERIAL AND METHOD OF MAKING THE SAME

Application filed December 26, 1929, Serial No. 416,488. Renewed September 24, 1931.

This invention relates to ceramic materials and methods of making the same, and has for its objects the provision of ceramic materials which may be easily molded and which may be converted into articles having high electrical insulating properties, and the provision of simple, expeditious and effective methods of making ceramic materials and articles.

In accordance with the general features of the invention as embodied in one specific form thereof, a temporary binding material such as a mixture of paraffin and carnauba wax is dissolved in a suitable solvent such as carbon tetrachloride which is heated to hasten the process of solution. To the solution, clay and talc are added, forming a mass of a thick liquid consistency. This mixture is thoroughly ground. After grinding it is heated so as to evaporate the solvent. While the solvent is evaporating, the mixture is stirred so as to avoid segregation of the wax from the clay and talc. The dry mixture of clay, talc and temporary binder is then ground and screened, the mixture is molded to the desired form and the molded part is heat treated at approximately 2200° F. to remove the paraffin and to harden the ceramic composition.

Figure 1:
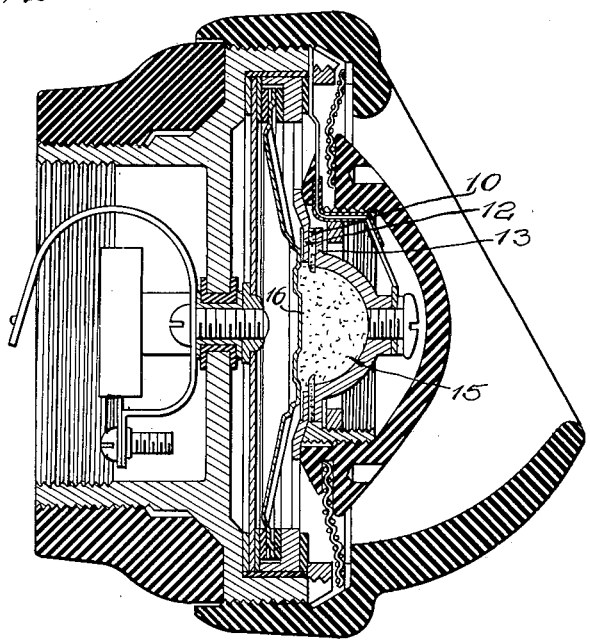
Figure 2:
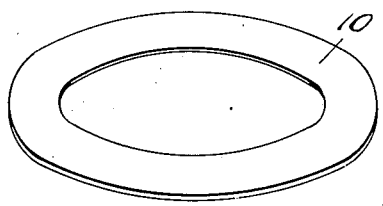

The above enumerated and other objects and features of the invention will be apparent from the following detailed description of one embodiment of the invention taken in conjunction with the accompanying drawings, in which Fig. 1 is a cross-sectional view of a telephone transmitter of a usual type including a part composed of a ceramic material made in accordance with the invention, and Fig. 2 is an enlarged perspective view of the part.

In practicing one method embodying the invention paraffin and carnauba wax in the proportion of 12 parts and 6 parts, respectively, are dissolved in a suitable solvent, such as carbon tetrachloride, which is heated to hasten the process of solution. In the specific embodiment of the invention approximately 113 parts of the solvent are employed. To the resulting solution 30 parts of clay and 70 parts of talc are added, forming a mass of a thick consistency. This mixture is thoroughly ground and after being ground it is heated so as to evaporate the solvent. While the solvent is evaporating the mixture is stirred to avoid segregation of the wax from the clay and talc. The dry mixture of clay, talc and temporary binder of paraffin and carnauba wax is then ground and screened to pass through a 30 mesh screen and remain on a 60 mesh screen, although other screen sizes may be found more desirable under other circumstances and for other purposes. The solution is thoroughly mixed throughout the mixture of talc and kaolin and the resulting mixture is simultaneously heated to evaporate the solution. The dry mixture of talc, kaolin, paraffin and carnauba wax is then thoroughly milled to reduce the particles to a small size and the resulting mass is screened to pass through a 30 and remain on a 60 mesh screen.

The granular material produced by the above outlined steps is a very satisfactory molding composition from which ceramic articles may be produced. One satisfactory method of employing the molding composition is to press a quantity of the powder into the desired form in a cold mold by means of a hydraulic press or other suitable apparatus, to trim the molded part, if necessary, to remove projecting fins, and to heat the molded part at a high temperature (about 2200° F.), to remove the paraffin and carnauba wax and to harden the ceramic composition.

Since it is difficult to press a dry mixture of talc and kaolin into a desired form, and when parts molded from these or similar materials are held together during the molding operation by clay plasticized with water, the resulting parts have a great tendency to shrink and warp when the molded parts are heated, a dry, temporary binding agent which is removed when the molded part is subjected to a high temperature, is employed to hold the talc and kaolin in the desired form in the process of molding, removing fins and handling previous to the firing operation. A very satisfactory material to be used as a temporary binding agent is paraffin mixed with a small quantity of another wax, asphalt, pitch or resin. Instead of the paraffin, ozokerite, ceresin, and materials known as high melting point mineral waxes may also be used with good results. Suitable waxes for use with paraffin for this purpose are carnauba wax, Montan wax, candelilla, beeswax, halowax, stearin, stearic acid and Japan wax, and the materials known as asphalts, pitches, and resins, although any other material or mixture of materials which would be volatilized or destroyed during the firing operation might be combined with paraffin to produce a temporary binding agent which would give satisfactory results. The variety of paraffin to be used and wax added to it are dependent upon the article to be molded and the qualities which are desired to facilitate the manufacture of the given article; for example, in some instances it might be desired to increase the hardness.

Experiments have shown that a temporary binding agent consisting of paraffin and a higher melting point wax, such as carnauba wax, may be most effectively mixed with ceramic material such as talc or clay in the form of a solution. Carbon tetrachloride is an effective solvent for paraffin, carnauba wax, Montan wax, and most other similar materials, and is the preferred solvent to be used in preparing a solution of the temporary binding agents for mixture with ceramic materials. However, any other readily volatile material which is a good solvent for paraffin, carnauba wax, Montan wax, etc., may be used instead of carbon tetrachloride.

The use of such a temporary binding agent with a mixture of talc and clay produces a molding composition from which articles may be cold molded in a desired shape for firing, and which will maintain its molded shape during the handling previous to the firing operation. The molding composition is of such a character that it flows freely under pressure, and in consequence produces compactly molded parts with sharp outlines. In addition it is sufficiently brittle to permit fins which are sometimes formed during the molding operation to be easily broken from the molded articles themselves.

The molding composition described hereinbefore is very suitable for use in the manufacture of so-called "barrier" rings used in some types of telephone transmitters, and a ring made of this composition is illustrated in the accompanying drawings. In utilizing the composition, a ring 10, such as is shown in Fig. 2 of the drawings, is prepared in accordance with the method described hereinbefore and is positioned between electrodes 12 and 13 of a telephone transmitter (Fig. 1) so that the inner circumference of the ring projects into a mass of granular carbon 15 positioned between the electrodes 12 and 13. Due to its position and shape, the barrier ring causes an electric current flowing from one electrode to the other electrode to traverse a path through the central part of the mass of carbon located between the electrodes. The electrical reistance offered to the passage of the current between the electrodes therefore depends entirely upon the resistance of the carbon particles, which in the operation of the transmitter may be rapidly varied because of the movement transmitted to the carbon particles by a diaphragm 16 which is caused to vibrate by the sound waves entering the transmitter.

Because of the high mechanical strength, high dielectric strength, high insulating resistance at both low and high temperatures, the permanence of the size, shape and electrical properties, and freedom from alteration by atmospheric conditions of ceramic materials produced by the above described method, barrier rings made from the molding composition described hereinbefore give results which are equal to or better than similar rings known to the art and have the additional advantage that they may be cheaply and easily made in the desired shape and size within very close limits.

It is, of course, to be understood that the embodiments of the invention described above are merely useful forms of the invention which illustrate how the invention may be practiced and the scope of the invention is not limited thereby, but the invention is limited only by the scope of the annexed claims.

What is claimed is:

1. A method of making ceramic molding compositions, which consists in mixing ceramic substances with a solution of paraffin and a material having a higher melting point than that of paraffin, and evaporating the solvent portion of the solution.

2. A method of making ceramic molding compositions, which consists in mixing talc and clay with a solution of paraffin and a material having a higher melting point than that of paraffin, and evaporating the solvent portion of the solution.

3. A method of making ceramic molding compositions, which consists in mixing talc and clay with a solution of paraffin and carnauba wax, and evaporating the solvent portion of the solution.

4. A method of making ceramic molding compositions, which consists in mixing talc and clay with a solution of paraffin and carnauba wax in carbon tetrachloride, and evaporating the carbon tetrachloride.

5. A method of making ceramic molding compositions, which consists in mixing about 70 parts talc and 30 parts kaolin with a solution of about 12.0 parts of paraffin 6.0 parts of carnauba wax in carbon tetrachloride, and evaporating the carbon tetrachloride.

6. A method of making ceramic materials, which consists in mixing ceramic substances with a solution of paraffin and a material having a higher melting point than that of paraffin, evaporating the solvent portion of the solution, and heating the resulting mixture at a temperature sufficiently high to remove the paraffin and higher melting material and to harden the remaining substances.

7. A method of making ceramic materials, which consists in mixing talc and clay with a solution of paraffin and carnauba wax, evaporating the solvent portion of the solution, and heating the resulting mixture at a temperature sufficiently high to remove the paraffin and carnauba wax and to harden the remaining substances.

8. A method of making ceramic materials, which consists in mixing talc and clay with a solution of paraffin and carnauba wax in carbon tetrachloride, evaporating the carbon tetrachloride, and heating the resulting mixture at a temperature sufficiently high to remove the paraffin and carnauba wax and to harden the remaining substances.

9. A method of making ceramic materials, which consists in mixing about 70 parts talc and 30 parts kaolin with about 12.0 parts of paraffin and 6.0 parts of carnauba wax dissolved in carbon tetrachloride and simultaneously evaporating the carbon tetrachloride, and heating the resulting mixture at a temperature of about 2200° F. to remove the paraffin and carnauba wax and to harden the remaining substances.

10. A method of making articles of ceramic materials, which consists in mixing ceramic substances with a solution of paraffin and a material having a melting point higher than that of paraffin, evaporating the solvent portion of the solution, molding the resulting mass into the desired form, and heating the molded mass at a temperature sufficiently high to remove the paraffin and higher melting material and to harden the ceramic substances.

11. A method of making articles of ceramic materials, which consists in mixing talc and clay with a solution of paraffin and a material having a higher melting point than than of paraffin, evaporating the solvent portion of the solution, molding the resulting mass into the desired form, and heating the molded mass at a temperature sufficiently high to remove the paraffin and higher melting materials and to harden the ceramic substances.

12. A method of making articles of ceramic materials, which consists in mixing talc and clay with a solution of paraffin and carnauba wax, evaporating the solvent portion of the solution, molding the resulting mass into the desired form, and heating the molded mass at a temperature sufficiently high to remove the paraffin and carnauba wax and to harden the ceramic substances.

13. A method of making articles of ceramic materials, which consists in mixing ceramic materials with a solution of paraffin and carnuaba wax in carbon tetrachloride, evaporating the carbon tetrachloride, molding the resulting mass into the desired form, and heating the molded mass at a temperature sufficiently high to remove the paraffin and carnauba wax and to harden the ceramic substances.

14. A method of making articles of ceramic materials, which consists in mixing talc and clay with a solution of paraffin and carnauba wax in carbon tetrachloride, evaporating the carbon tetrachloride, molding the resulting mass into the desired form, and heating the molded mass at a temperature sufficiently high to remove the paraffin and carnauba wax and to harden the remaining substances.

15. A method of making articles of ceramic materials, which consists in mixing about 70 parts talc and 30 parts kaolin with about 12.0 parts of paraffin and 6.0 parts carnauba wax dissolved in carbon tetrachloride and simultaneously evaporating the carbon tetrachloride, molding the resulting mass into the desired form, and heating the molded mass at a temperature of about 2200° F. to remove the paraffin and carnauba wax and to harden the remaining substances.

16. A ceramic molding composition, comprising ceramic substances combined with paraffin and a material having a melting point higher than that of paraffin.

17. A ceramic molding composition, comprising ceramic substances combined with paraffin and carnauba wax.

18. A method of making ceramic molding compositions, which consists in mixing ceramic substances with a solution of a high melting point mineral wax, and another volatilizable material, and evaporating the solvent portion of the solution.

19. A ceramic molding composition, comprising talc and clay combined with paraffin and carnauba wax.

20. A ceramic molding composition, comprising about 70 parts talc, 30 parts kaolin, 12.0 parts paraffin and 6.0 parts carnauba wax.

In witness whereof, we hereunto subscribe our names this 13th day of December A. D., 1929.

LEON I. SHAW.
WALTER J. SCOTT.